United States Patent [19]

Bensel

[11] 4,451,019

[45] May 29, 1984

[54] POLE TYPE SPEAKER SUPPORT STRUCTURE

[76] Inventor: James B. Bensel, 2005 Brucemount Pl., Fayetteville, N.C. 28304

[21] Appl. No.: 332,537

[22] Filed: Dec. 21, 1981

[51] Int. Cl.³ .............................................. A47G 29/00
[52] U.S. Cl. .......................................... 248/1; 211/86; 312/246
[58] Field of Search ...................... 248/1, 188.4, 354 S, 248/356, 359.1; 312/111, 246, 247; 211/86; 179/146 E

[56] References Cited

U.S. PATENT DOCUMENTS

| | | | |
|---|---|---|---|
| 1,495,541 | 5/1924 | Watrous | 248/359.1 |
| 2,051,420 | 8/1936 | Renholdt | 211/86 |
| 2,465,742 | 3/1949 | Nalle | 248/188.4 |
| 3,143,331 | 8/1964 | Corey | 248/200.1 |
| 3,401,652 | 9/1968 | Thor | 248/200.1 |
| 4,088,365 | 5/1978 | Johnson | 248/200.1 |

*Primary Examiner*—J. Franklin Foss
*Assistant Examiner*—David L. Talbott

*Attorney, Agent, or Firm*—Mills & Coats

[57] ABSTRACT

The present invention entails a pole type speaker support structure that is designed to support an audio speaker intermediately between the floor and ceiling of a structure. In particular the pole type speaker support structure of the present invention is adjustable axially, and when erected, includes two spaced apart speaker engaging plates that engage the upper and lower portions of the supported speaker. Extending from each of the speaker support plates is a pole type support, with each respective pole being adapted and designed to extend therefrom to meet and effectively met or join either the floor or ceiling. There is provided a length adjustment device that screws axially along one end portion of a respective pole type support structure such that the length thereof can be adjusted and so as to effectively form an upright ceiling to floor structure including an upper pole engaged with the ceiling, the speaker, and a bottom pole extending from the speaker to the floor.

6 Claims, 3 Drawing Figures

4,451,019

POLE TYPE SPEAKER SUPPORT STRUCTURE

FIELD OF INVENTION

The present invention relates to speaker support structures, and more particularly to speaker support structures for supporting audio speakers above floor level and intermediately between the floor and ceiling of a structure.

BACKGROUND OF INVENTION

A review of the prior art will reveal that there are various types of support structure for supporting audio speakers. Primarily one will find that a substantial number of such prior art deals with supporting or partially enclosing speakers at or about floor level within a structure.

It is well appreciated that for optimum performance an audio speaker, in a quality sound system, should be supported above floor level.

There have been attempts at designing speaker support structures that do in fact support the speakers above floor level within a room. But the drawback to such speaker support systems known hereinbefore is that such often tend to be large, bulky, hard to manage, and accordingly expensive. There has been little, if any, effort in designing a relatively simple and easy to install speaker support structure that is relatively inexpensive and which is designed to support a speaker above floor level intermediately between the ceiling and floor of a room structure.

SUMMARY OF INVENTION

The present invention entails a speaker support structure that is designed to overcome the shortcomings of prior art devices and to particularly support a speaker intermediately between the ceiling and floor of a room. As will be appreciated from subsequent portions of this disclosure, the present invention entails a pole type speaker support structure wherein the same extends continuously from the ceiling to the floor with a supported speaker being held in a compressive fashion intermediately between upper and lower portions.

In addition the speaker support structure of the present invention has the advantage of being axially adjustable in order that the length of the same can be adjusted in order to accommodate speakers of various heights.

It is, therefore, an object of the present invention to provide a speaker support structure for supporting an audio speaker intermediately between the ceiling and the floor of a room.

More particularly, an object of the present invention resides in the provision of a speaker support structure that is of the pole type and which includes upper and lower supports that extends from the ceiling and floor, respectively, and which effectively engage and support the supported speaker therebetween in a compressive fashion.

Another object of the present invention resides in the provision of a pole or post type speaker support structure of the character referred to above that is adjustable to accommodate and support various size speakers.

Another object of the present invention resides in the provision of a speaker support structure that is easy to install.

Still a further object of the present invention is to provide a speaker support structure for supporting a speaker intermediately between the floor and ceiling of a room and which requires a minimum amount of material and which supports the speaker in a stable and rigid fashion.

Another object of the present invention resides in the provision of a speaker support structure of the character referred to above that is designed to hold and support the speaker in a sturdy and stable fashion but yet which does not scratch, harm or any way damage the surrounding wall structure of the speaker.

It is also an object of the present invention to provide a speaker support structure of the character referred to above that is particularly designed to accept and be compatible with various size speakers and which is axially adjustable in length for that very purpose.

Finally an object of the present invention resides in the provision of a pole type compressive speaker support structure of the character referred to above that is easy to manufacture and is particularly suitable for production in various sizes and lengths so as to make the same compatible for various size speakers and ceiling heights.

Other objects and advantages of the present invention will become apparent from a study of the following description and the accompanying drawings which are merely illustrative of the present invention.

Figure 1:
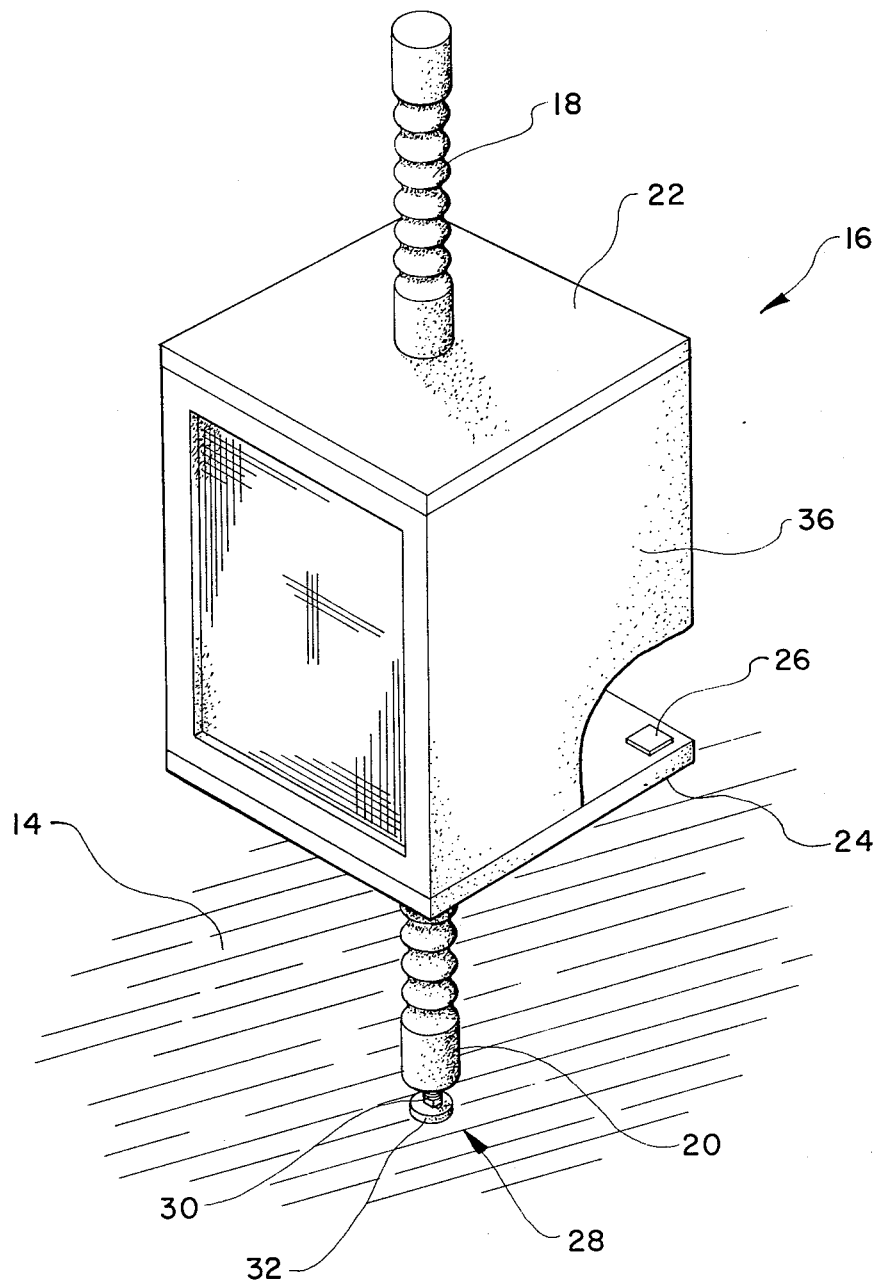
FIG. 1 is a perspective view of the pole type speaker support structure of the present invention.
Figure 2:
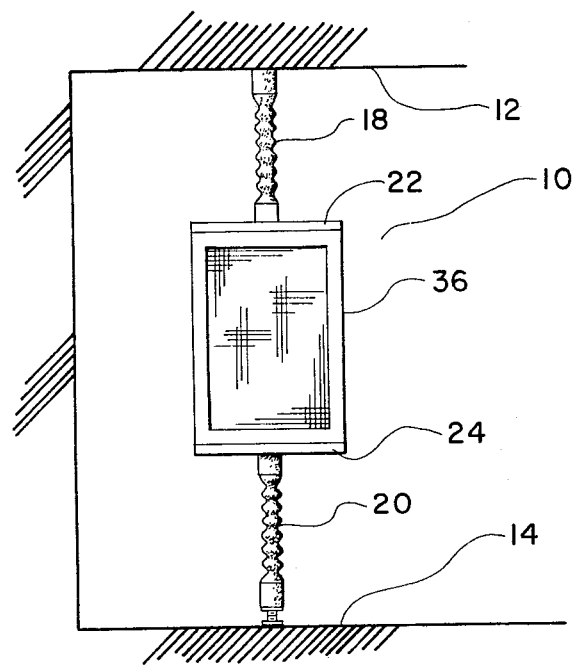
FIG. 2 is a side elevational view of the pole type speaker support structure of the present invention extending between the floor and ceiling of a room structure.

With further reference to the drawings, there is shown therein a room 10 having a ceiling 12 and a floor 14. The present invention entails a pole type speaker support structure, indicated generally by the numeral 16 that is designed to support a speaker 36 intermediately between ceiling 12 and floor 14.

Turning to a description of pole type speaker support structure 16, it is seen that the same is of the pole type and is generally designed to form a continuous floor to ceiling structure with a speaker 36 being supported in a compressive fashion intermediately between ceiling 12 and 14.

Forming a part of pole type speaker support structure 16 is speaker support means in the form of an upper post or pole member 18 and a lower pole or post member 20. Upper pole member 18 includes a ceiling end that is adapted to engage ceiling 12 and a lower end that has secured thereto an upper speaker support plate 22.

Lower pole member 20 includes a bottom or floor end that is normally disposed adjacent the floor and extends upwardly therefrom where a top portion thereof includes an upper speaker support plate 24. Both speaker support plates 22 and 24 include a face area that is adapted to engage and bear against speaker 36. The engaging face of each speaker support plate 22 or 24 includes pad means 26 (FIG. 1) that generally forms a soft barrier between the speaker 36 and the respective support plate 22 or 24 to prevent the same from scratching or harming speaker 36. The pad means 26 can be in the form of a plurality of cloth or soft material tabs or even some form of resilient or foam backing material.

Figure 3:
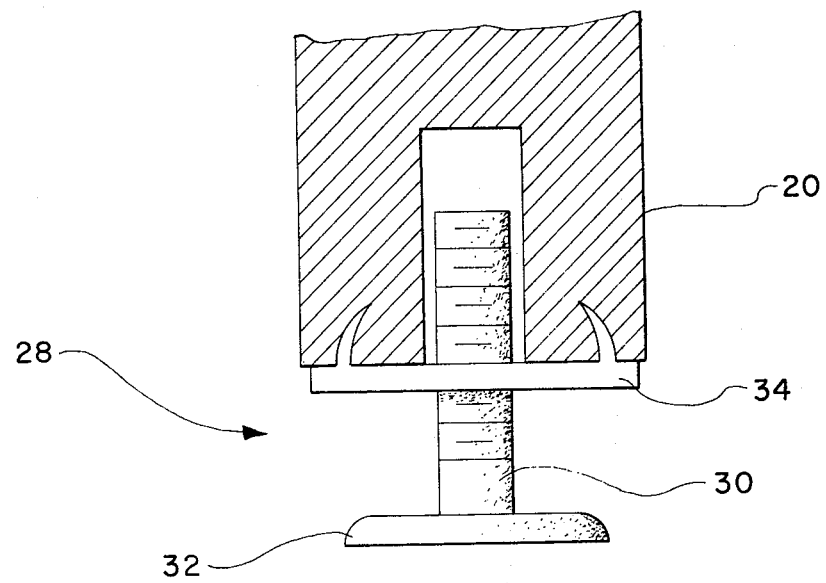
FIG. 3 is an enlarged view of a height adjustment foot adapted to join the lower end of the pole type speaker support structure of the present invention.

To adjust the length of pole type speaker support structure 16, there is provided a screw foot, indicated generally by the numeral 28, that is axially movable about one end of the pole type speaker support structure. In the case of the present embodiment, screw foot 28 includes a threaded shaft 30 and a bottom 32, with the shaft 30 adapted to extend through a void formed in the lower pole support member 20 (FIG. 3). In addition, there is provided a claw ring 34 that includes a series of upstanding claws that engage the lower area of pole member 20. Moreover, claw ring 34 is threaded to receive shaft 30.

It is appreciated that upper and lower pole support members 18 and 20 could be provided in various lengths to accommodate various height speakers and various height ceilings. The provision of screw foot 28 enables the effective length of the pole type support structure 16 to be adjusted such that the upper and lower support members 18 and 20 can be aligned and positioned on opposite sides of speaker 36, as shown in the drawings, such that speaker 36 is held in a compressive fashion. It is appreciated that by selectively screwing screw foot 28 that the effective length of the pole type speaker support structure 16 can either be extended or retracted so as to appropriately suspend and support speaker 36 intermediately between ceiling 12 and floor 14.

It is to be understood that in erecting pole type speaker support structures 16 that a level would be useful in assuring that the speaker is properly oriented upright and that the respective upper and lower pole members 18 and 20 are plumb.

It is further appreciated that the pole type speaker support structure 16 of the present invention is relatively simple, easy to install, and can easily be removed and erected at another convenient location.

From the foregoing specification, it is appreciated that the pole type speaker support structure 16 of the present invention comprises a minimum amount of structure for supporting a speaker 36 at a position above the floor 14 and particularly at a position intermediately between ceiling 12 and floor 14. In addition, the same is very easy to manufacture, and as noted above, can be utilized to accommodate various size speakers and ceiling heights.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A compressive pole type audio speaker support structure for adjustably supporting various size audio speakers intermediately between a floor and ceiling structure, comprising: speaker support means including an elongated lower pole support structure normally extending upright between the floor and the speaker to be supported and including upper and lower ends, and an elongated upper pole support structure normally extending between said ceiling and a top portion of said speaker and including upper and lower ends, and wherein said upper and lower pole support structures are aligned; a lower speaker support plate means fixed to the upper end of said lower pole support structure of said speaker support means for receiving and supporting a bottom portion of said audio speaker; an upper speaker support plate means fixed to the lower end of said upper pole support structure for engaging a top portion of said speaker and acting downwardly thereon, and wherein said upper and lower speaker support plate means are aligned and define an audio speaker receiving spaced therebetween for receiving a speaker; adjustment means operatively associated with said pole speaker support means for effectively adjusting the length of the same between said ceiling and floor such that said speaker is supported in compression between said upper and lower pole support structure forming a part of said speaker support means and wherein said lower and upper speaker support plate means including a pair of opposed flat speaker engaging surfaces of a substantial area for engaging said speaker and bearing thereagainst so as to hold and retain said speaker by compression thereby obviating the need for a screw or bolt type interconnection between the plate means and the speaker.

2. The pole type compressive speaker support structure of claim 1 wherein said upper and lower speaker support plate means includes a pair of generally flat plates with each plate having a speaker engaging surface that includes cushioning means for engaging said speaker to be supported to avoid scratching or significantly harming the surface of the speaker being supported.

3. The pole type compressive speaker support structure of claim 2 wherein said adjustment means for adjusting the effective length of said speaker support structure includes a screw foot having a threaded shaft extending therefrom and a threaded claw ring for receivng said threaded shaft, and wherein said speaker support means includes a void for receiving said shaft of screw foot such that said screw foot can be moved axially with respect to said speaker support means for effectively adjusting the length between extreme ends of said speaker support means extending between said ceiling and lower structure by adjusting said threaded shaft within said claw ring.

4. The pole type compressive speaker support structure of claim 3 wherein said screw foot is disposed about the lower end of said lower speaker support structure forming a part of said speaker support means such that the same normally engages the floor underlying said supported speaker such that in adjusting the speaker support structure the distance between the bottom of the support speaker and the floor can be adjusted such that said upper support structure cooperates with said lower support structure to hold and support said speaker in a compressive fashion intermediately between said ceiling and floor.

5. The pole type compressive speaker of claim 4 wherein said upper support member of said speaker support means includes a ceiling engaging end that contacts and engages said ceiling.

6. The pole type compressive speaker support structure of claim 1 wherein said lower and upper pole support structures comprise a pair of elongated poles secured centrally to said lower and upper speaker support plate means wherein the speaker is supported in compression between said speakers and support plate means by only said pair of poles that extend between the floor and ceiling structure.

* * * * *